US012093846B1

(12) United States Patent
Xue et al.

(10) Patent No.: US 12,093,846 B1
(45) Date of Patent: Sep. 17, 2024

(54) HIERARCHICALLY STRUCTURED TOPIC MANAGER THAT ORGANIZES DIALOGS WITH AN AI SYSTEM

(71) Applicant: Escendant Ltd, Northamptonshire (GB)

(72) Inventors: Binbin Xue, London (GB); Simon Tyler, Malmesbury (GB); Neil Murray, Northampton (GB); Jenni Henderson, Northampton (GB)

(73) Assignee: Escendant Ltd, Northamptonshire (GB)

( * ) Notice: Subject to any disclaimer, the term of this patent is extended or adjusted under 35 U.S.C. 154(b) by 0 days.

(21) Appl. No.: 18/444,314

(22) Filed: Feb. 16, 2024

(51) Int. Cl.
  *G06F 16/31* (2019.01)
  *G06F 16/332* (2019.01)
  *G06N 5/04* (2023.01)
(52) U.S. Cl.
  CPC ............. *G06N 5/04* (2013.01); *G06F 16/322* (2019.01); *G06F 16/3329* (2019.01)
(58) Field of Classification Search
  CPC .......................... G06F 16/3329; G06F 16/322
  See application file for complete search history.

(56) References Cited

U.S. PATENT DOCUMENTS

| 2019/0205726 A1* | 7/2019 | Khabiri | G06N 3/006 |
| 2022/0138433 A1* | 5/2022 | Divakaran | G06N 3/045 704/9 |
| 2022/0300716 A1* | 9/2022 | Sabharwal | G06F 16/24578 |
| 2023/0117206 A1* | 4/2023 | Venkateshwaran | G06Q 40/08 704/9 |
| 2023/0306279 A1* | 9/2023 | Bar Eliyahu | G06N 5/022 |
| 2024/0012842 A1* | 1/2024 | Kislal | G06F 16/383 |
| 2024/0070204 A1* | 2/2024 | Prakash | G06F 16/243 |
| 2024/0086366 A1* | 3/2024 | Gnanasambandam | A61B 5/14532 |

OTHER PUBLICATIONS

Chen, et al., "Walking Down the Memory Maze: Beyond Context Limit Through Interactive Reading", arXiv e-prints (Oct. 8, 2023); 15 pages.

* cited by examiner

*Primary Examiner* — Dangelino N Gortayo
(74) *Attorney, Agent, or Firm* — ARC IP Law, PC; Joseph J. Mayo

(57) ABSTRACT

A system that manages a dialog between a user and an AI system using a hierarchically structured tree of topics. An illustrative application is collection of a personal history. A topic manager repeatedly selects a topic and requests the AI system to generate a question based on summary information stored in the associated topic node; this avoids sending the entire dialog to the AI system each time, which would be impossible for long conversations due to AI context window limitations. The AI system analyzes each response from the user to identify new topics to add to the tree, and to update the summary associated with each topic node. Vector embeddings of topic names may be used to place new topic nodes in the most relevant position in the tree. Topics may be selected using a biased tree walk that preferentially selects nodes that have been less explored in previous questions.

20 Claims, 11 Drawing Sheets

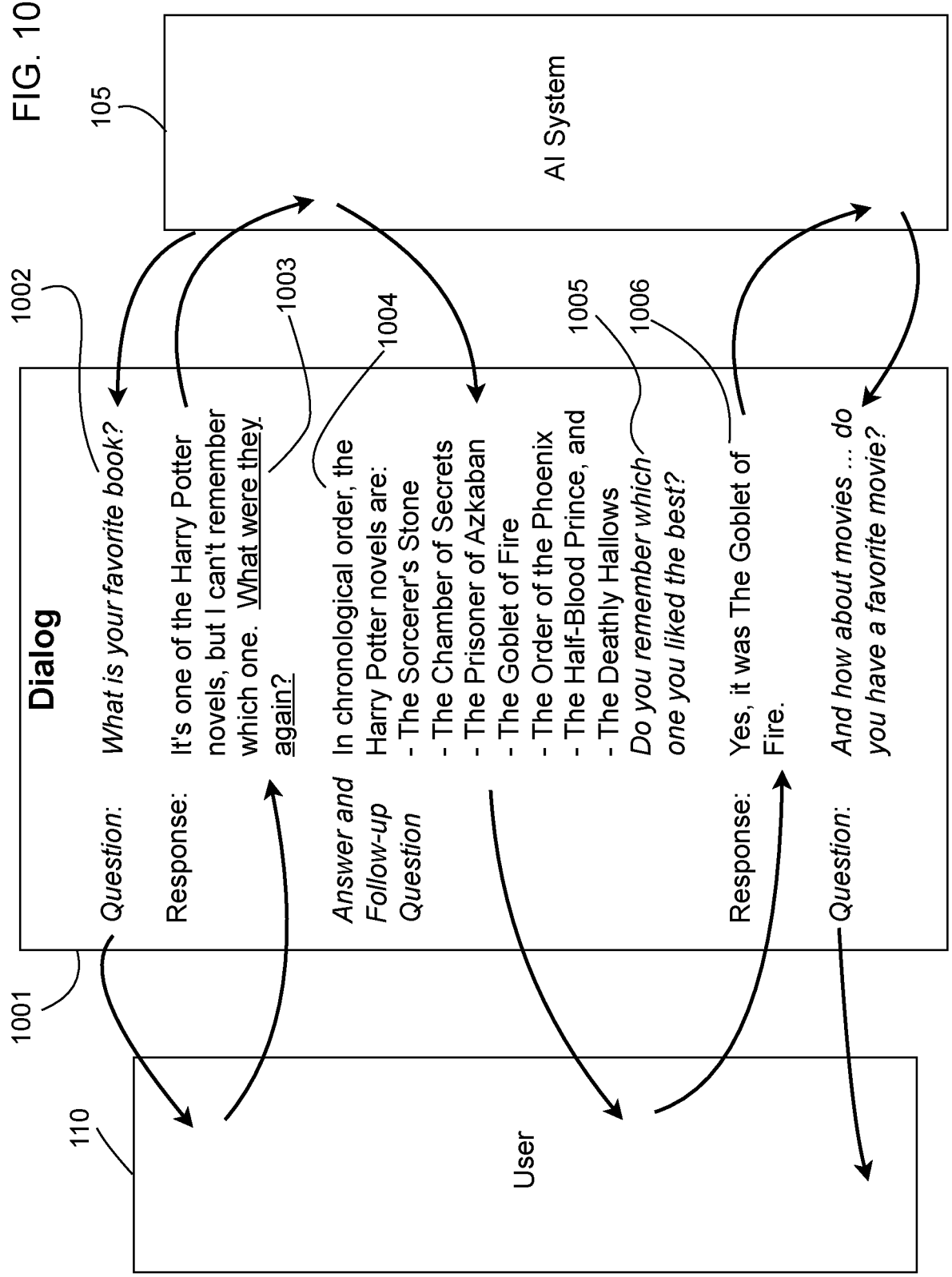

HIERARCHICALLY STRUCTURED TOPIC MANAGER THAT ORGANIZES DIALOGS WITH AN AI SYSTEM

BACKGROUND OF THE INVENTION

Field of the Invention

One or more embodiments of the invention are related to the fields of information processing and artificial intelligence (AI). More particularly, but not by way of limitation, one or more embodiments of the invention enable a hierarchically structured topic manager that organizes dialogs with an artificial intelligence system.

Description of the Related Art

Chatbots and similar artificial intelligence systems generally respond to users' questions or generate content based on requests from users. They are not typically designed to instead collect information from users. Some systems can generate specific questions for a user if they are given explicit instructions to do so (such as "generate a list of questions that ask me about my last vacation"); however, existing systems are not engineered to generate questions that explore a wide range of aspects of a broad topic, such as a user's personal history. To ensure that questions are not repeated, a system would need to have full knowledge of what it knows and what has been previously asked and answered. However, as dialogs become longer, these systems eventually reach context window limitations that prevent them from ingesting the entire conversation history. This limitation prevents systems from effectively collecting information on complex subjects, for example when topics raised early in a conversation may need to be revisited but cannot be remembered by existing systems due to these context window limitations. Transmitting a large amount of context to an artificial intelligence system may also degrade performance, increase cost, and reduce the quality of the AI system's responses.

A related limitation of existing systems is that the dialogs are guided exclusively by the users' responses. Since users may discuss topics in a somewhat random order, the dialogs may be ineffective at covering a range of topics in a structured manner.

For at least the limitations described above there is a need for a hierarchically structured topic manager that organizes dialogs with an artificial intelligence system. Such a system may for example use a tree of dialog information to reduce the amount of context that needs to be transmitted to the AI system for each interaction, thereby addressing the limitations described above.

BRIEF SUMMARY OF THE INVENTION

One or more embodiments of the invention may enable a hierarchically structured topic manager that organizes dialogs with an artificial intelligence system. An illustrative application may be collection of a user's personal biographical history.

One or more embodiments of the invention may include a processor that is coupled to a memory and to a user interface used by a user. It may have a hierarchical topic database stored in the memory that has a tree of topic nodes. Each topic node may have a topic name and one or both of one or more questions related to the topic name and the response from the user to these questions, and a summary that summarizes all or a portion of these responses from the user to the questions related to the topic name. In one or more embodiments, a topic node may also have metadata, such as names, dates, locations, and named entities. The system may include an artificial intelligence (AI) system that executes on the processor; the artificial intelligence system may include a large language model. The AI system may for example generate questions for the user, and generate the summaries associated with topic nodes. It may include a topic manager that executes on the processor and is coupled to the hierarchical topic database and to the AI system. The topic manager may repeatedly perform the following steps: track a current topic node in the tree of topic nodes; create a question generation request based on the hierarchical topic database and on the current topic node; transmit the question generation request to the AI system and receive a question from the AI system that is related to the current topic node and that has not been answered in responses from the user or in the node summary; transmit the question to the user via the user interface; receive a response from the user via the user interface; create a response analysis request based on the response from the user; transmit the response analysis request to the AI system and receive a response analysis from the AI system; and update the hierarchical topic database and the current topic node based on the response analysis. In one or more embodiments, one or both of the topic manager and the AI system may include a capability to extract metadata (names, dates, locations, named entities, etc.) from the discussion and to store this metadata with topic nodes.

In one or more embodiments, the root topic node of the tree may include a personal biography of the user. In one or more embodiments, child nodes of the root topic node may include one or more of: early life and family background; education and academic pursuits; career choices and professional experiences; personal interests and hobbies; travel experiences and memorable adventures; influential mentors or role models; significant life events and turning points; challenges and obstacles overcome; lessons learned and personal growth; philosophies and beliefs; relationships and friendships; contributions to society or community involvement; accomplishments and achievements; personal values and guiding principles; reflections on past and hopes for future; cultural or social experiences; favorite books, movies, or works of art; health and wellness journey; leadership experiences and lessons; legacy and impact on others.

In one or more embodiments, the question generation request and the response analysis request may be combined into a single request.

In one or more embodiments, one or both of the question generation request and the response analysis request may include multiple prompts or function calls transmitted to the artificial intelligence system.

In one or more embodiments of the invention, the question generation request may include information associated with the current topic node, a path from the root of the topic tree to the current topic node, topic names of child nodes of the current topic node, and an instruction to the AI system to generate one or more questions about the topic name of the current topic node that are not answered in the summary and are not related to the child nodes. In one or more embodiments the information associated with the current topic node may include one or more of the topic name of the current topic node, the one or more questions related to the topic name and the responses from the user, and the summary that summarizes the responses from the user to the one or more questions related to the topic name. In one or more embodiments, this information may also include topic guidance, which may for example provide additional detail about the topic's subject that is not captured in the topic name.

In one or more embodiments, the response analysis request may include information associated with the current topic node, the question to the user, the response from the user, and an instruction to the AI system to update the summary based on the response, and to identify one or more of relevance of the response to the topic name, additional topics identified in the response, and a recommended next topic.

In one or more embodiments, the response from the user may include a request to change to a new topic, and the recommended topic generated by the AI system may include the new topic requested by the user.

In one or more embodiments, one or both of the topic manager and the artificial intelligence system may be further configured to split the current topic node into two or more new topic nodes, and to generate summaries associated with each of the two or more new topic nodes. In one or more embodiments a node may be split when when one or more size metrics associated with the current topic node exceed a threshold, or when the topic manager or the artificial intelligence system determines that the user's response raises a topic that belongs in a new topic node.

In one or more embodiments, the topic manager may track a conversation session that includes a starting point when the AI system generates an initial question about the topic name of the current topic node, an ending point when the response analysis includes a determination that the initial question has been sufficiently answered, questions generated by the AI system and responses provided by the user between the starting point and the ending point. It may include this conversation session in the response analysis request.

In one or more embodiments, the response analysis may include one or more additional topics raised in the response from the user. For each additional topic, the topic manager may identify a related topic node in the tree that is most closely related to the additional topic, insert a new node as a child of this related topic node and assign a topic name of the new node as the additional topic, and generate a summary of the new node based on responses from the user related to the topic name of the new node.

In one or more embodiments, the response analysis may include a next topic for discussion, and the topic manager may be further configured to select a node in the tree corresponding to this next topic for discussion, and to set the current topic node to this selected node.

In one or more embodiments, the response analysis may include an indication that another unspecified topic should be selected. The topic manager may select a node in the tree and set the current topic node to this node. In one or more embodiments, selecting this node may include randomly selecting the node using selection probabilities that are higher for nodes in the tree that have been less explored in discussions with the user. In one or more embodiments the selection probability of a node may be inversely related to one or more of: the number of descendants in the tree of this node, a measure of the user's engagement with questions previously asked associated with this node, a recency of questioning related to this node, the length of the summary associated with this node, and the number of questions previously asked associated with this node.

In one or more embodiments, the response from the user may include a request for information. The response analysis request to the AI system may include instructions for the AI system to generate an answer to the request from the user for information, and the topic manager may be further configured to transmit this answer to the user via the user interface.

BRIEF DESCRIPTION OF THE DRAWINGS

The above and other aspects, features and advantages of the invention will be more apparent from the following more particular description thereof, presented in conjunction with the following drawings wherein:

FIG. 10 shows an illustrative dialog between the system and a user where the user asks the system for information in order to complete a response to a question.

DETAILED DESCRIPTION OF THE INVENTION

A hierarchically structured topic manager that organizes dialogs with an artificial intelligence system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention may organize, guide, facilitate, conduct, and analyze a dialog between a user and an artificial intelligence engine. A dialog may be used for example to collect and organize information from the user about a topic on which the user has knowledge, experience, or expertise. An illustrative application of one or more embodiments of the invention may be for example to collect biographical information from the user, in order to generate a structured and detailed record of the user's personal history. This personal history may be valuable for example for the user's relatives and friends; for public figures the personal history may also be valuable for official archives or for historical records, or as input to written biographies or documentaries. A potential benefit of embodiments of the system is that the system poses specific questions to the user to ensure that a wide, comprehensive range of topics are covered. This may lead to a more complete record than simply asking the user to record his or her memories.

Collection of a personal history is one illustrative application of embodiments of the invention. Other potential applications may include for example, without limitation: collection of information about a field of study from an expert; collection of opinions and advice on decisions or future strategies, in commercial or government fields; obtaining comments from one person on another person's work, for example for a review; and developing a skeleton for a future article, book, or creative work. Embodiments of the invention may be applied in any field that requires or benefits from iterative collection of structured information from a user by conducting a dialog with the user. One or more embodiments of the invention may also conduct dialogs with multiple users on the same or similar topics, either in parallel or sequentially.

Figure 1:
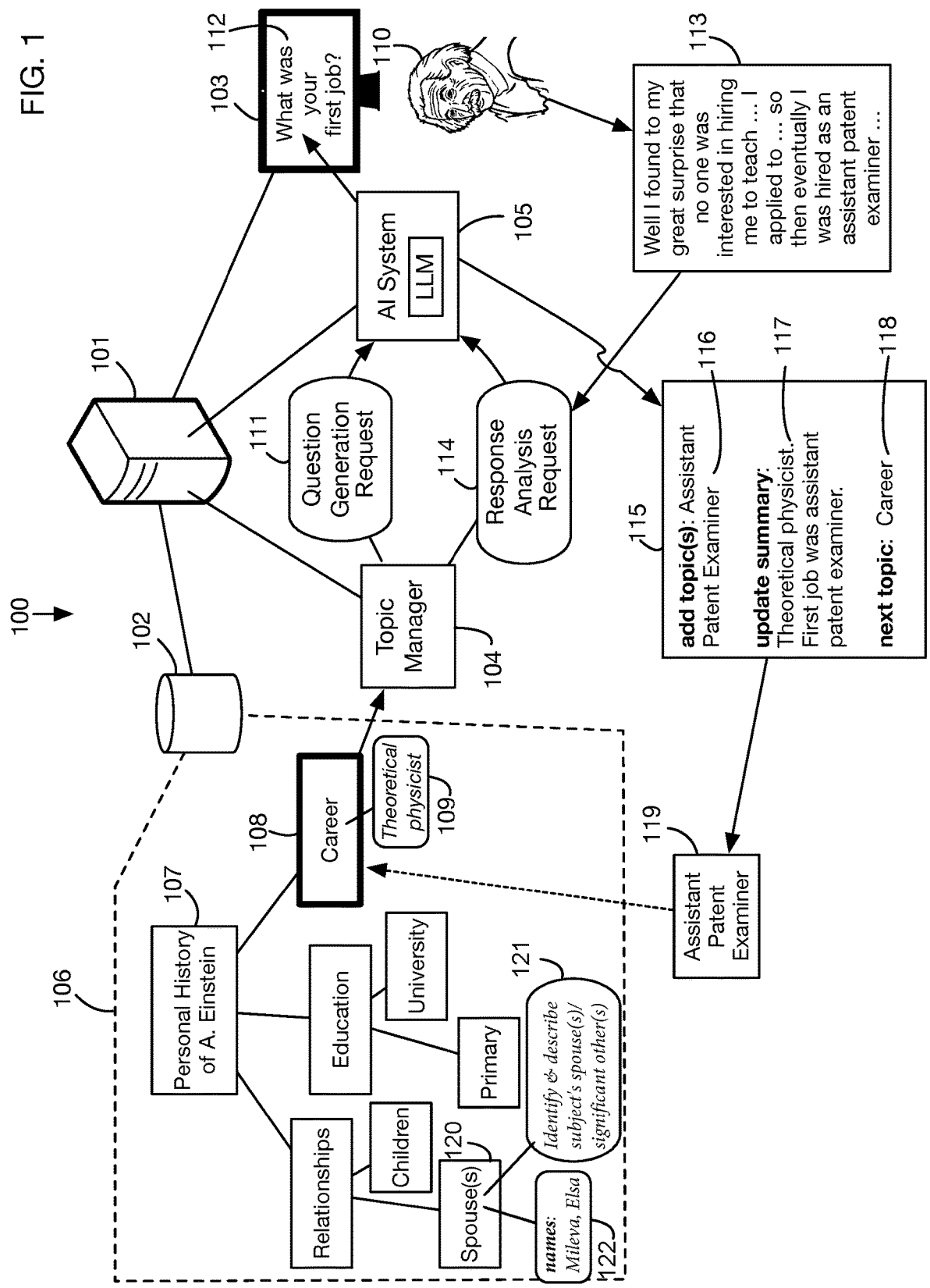
FIG. 1 shows an architectural diagram of illustrative hardware and software components of an embodiment of the invention.

FIG. 1 shows a block diagram of components of an illustrative embodiment 100 of the invention. This illustrative embodiment is targeted towards the application of collecting a user's personal history. The embodiment organizes and conducts a dialog between the system and user 110. In this dialog, the system generates questions that address various aspects of user 110's personal biographical history, and it receives and analyzes the user's responses. In one or more embodiments the system may also respond to questions posed by the user; for example, the user may ask for reminders about what he has previously discussed, or he may seek more general knowledge that would assist him in responding to the system's question.

The components of the system may execute on one or more processors 101, which may include, without limitation, a desktop computer, a laptop computer, a server, a tablet, a smartphone, a smartwatch, a CPU, a GPU, an ASIC, or a network of any combination of these devices. Processor(s) may or may not be collocated with user 110. The processor(s) may be attached to a memory 102 and to a user interface 103, by any types of links or network connections. Memory 102 may contain a summary of the user's responses to questions asked to date, as well as indications of areas where additional questions and responses are needed. Memory 102 may be any type or types of storage, which may be centralized or distributed. User interface 103 may be used to communicate questions to user 110 and to receive the user's responses to these questions. The user interface 103 may for example be a screen and a keyboard (or mouse or pen or touchscreen or any other input device), or a voice interface that speaks questions to the user and receives spoken responses. Any type or types of user interface may be used in one or more embodiments of the invention.

Software components of the system may include a topic manager 104 and an artificial intelligence (AI) system 105. These components may execute on the same processor(s) or on different processor(s). The AI system may include or may be linked to a large language model (LLM), such as ChatGPT® for example. The AI system may understand natural language queries and may be able to respond with natural language output. Topic manager 104 may manage topics for different stages of a dialog with user 110. The topic manager 104 may organize and structure the conversation between the system and the user. Topic manager 104 may manage a tree or similar data structure 106 with nodes that represent specific topics that have been raised or that have been or should be discussed in the dialog with user 110. The root node 107 of the tree represents the general theme for the dialog with the user; in this example the root node name is "Personal History" of user 110. Other subjects for dialogs may have different root names; for example, a dialog to extract knowledge of quantum mechanics from user "R. Feynman" may have a root node with topic name "Quantum Mechanics according to R. Feynman". Different tree structures may be appropriate for different users and for different topics; for example, a conversation with R. Feynmann about his personal history might have "Quantum Mechanics" as a topic node somewhere in the tree, with "Personal History" as the root node, whereas a conversation specifically on Quantum Mechanics might have "Quantum Mechanics" as the root node. Any type of tree structure may be used in one or more embodiments of the invention. The structure of the tree may evolve dynamically as the conversation evolves, depending on the questions asked and the responses received.

Various types of information may be associated with each node in the topics tree, such as for example a topic name, and a summary of all or a portion of the user's response or responses associated with that topic. (The summary may be empty or a placeholder if the topic has not yet been discussed with the user.) The complete record of the conversation between the user and the system regarding a topic may also be stored in the topic node, although this complete record may not always need to be transmitted to the system for generation of subsequent questions, as described below. In one or more embodiments, topic nodes may also contain metadata such as names, dates, titles, or other types of information. In some situations, a topic name may be too short to convey the meaning of the topic to the AI system, so additional "topic guidance" may be associated with a topic node to describe the topic more completely. Child nodes of each topic node represent specific subtopics that are included in, but more specific than, the parent topic node.

Structuring topics into a hierarchy of topic nodes provides several advantages. First, as described below with respect to FIG. 2, the tree structure allows relevant context to be transmitted to the AI system without exceeding the context window size that the AI system can accept. Second, since the dialog with the user may not follow a linear order, such as when the user wants to change the subject or raises a new unrelated topic, a linear arrangement of the user's responses in temporal order may not be logical or optimal; the tree structure allows information to be organized logically regardless of when in the dialog the information appears. Third, the tree structure indicates where the collected information is sparse, in order to guide future questions, as described below with respect to FIG. 9. And finally, the tree structure automatically organizes the information collected from the user so that the final product after the dialog is completed can be readily searched and understood.

Topic manager 104 tracks a current topic node 108; this current node may change as the dialog with the user proceeds. Associated with this current topic node is a summary 109 of all or a portion of the responses the user has previously given to questions related to the current topic. (Each node in the tree may have an associated summary; for simplicity FIG. 1 shows only the summary associated with node 108.) This summary 109 is also updated as the dialog proceeds. Using the current topic node 108 and summary 109, topic manager 104 creates a question generation request 111, and it transmits this request to the AI system 105. The request 111 may include any type or types of communication between the topic manager 104 and the AI system 105, including for example, without limitation, natural language prompts or prompt templates, function calls to AI system APIs, or settings for the AI system parameters. A single request 111 may include multiple such communications. The AI system uses the information in the request 111 to generate a question 112 that will collect more information about the current topic 108. Questions generally should not be repeated, unless the user has not answered a previous question; they should explore areas that have not yet been answered in the user's responses or in the summary of the user's responses. This question is transmitted to user interface 103. The user 110 then responds to the question with a response 113. Topic manager 104 then uses the response 113 and information 108 and 109 about the current topic node to generate a response analysis request 114 that is sent to AI system 105. (As for request 111, request 114 may include any combination of prompts, function calls, settings, or other communications between the topic manager and the AI system.) The AI system then generates a response analysis 115. A response analysis may contain various types of information that help manage the topic tree 106 and help guide the further dialog with the user. In the illustrative example shown in FIG. 1, response analysis 115 contains an additional topic 116 that should be added to the tree (which is based for example on new topics identified in the user's response), and update 117 to the summary 109 of the current node, and a suggested next topic 118 for the next question. In this example the suggested next topic 118 is the same as the current topic node 108, indicating that the dialog should continue to explore the Career topic with further questions. Topic manager 104 takes the additional topic 116 identified in the response analysis 115 and creates a new topic node 119 for this new topic. The topic manager adds the new node 119 to the tree, in this case as a child of node 108. (The discussion below with respect to FIG. 7A and FIG. 7B describes how the topic manager may determine where in the tree to place a new topic node.)

The process shown in FIG. 1 may continue to drive a dialog with user 110 to explore all portions of topic tree 106. As the dialog proceeds, the topic tree 106 may be expanded as needed to cover new topics and subtopics, and node summaries such as summary 109 for node 108 may be updated to reflect the additional responses from the user.

Illustrative topic node 120 in topic tree 109 has associated topic guidance information 121 that describes the topic in greater detail. Topic guidance may not be needed for all topic nodes if for example a short topic name is sufficiently clear. When needed, the topic guidance may be manually configured or may be generated by the AI system. Topic node 120 also has associated metadata 122, which in this situation is the names of the subject's spouses. Metadata may be any type of structured or semi-structured information, such as for example names, places, dates, named entities, or credentials. When topic guidance or metadata are present, they may also be passed to the AI system 105 in a question generation request 111, and the response analysis 115 may generate or update this information.

The scenario illustrated in FIG. 1 shows a simple situation where the system poses a question, and the user answers it. Dialogs between the system and the user may be more complex, in that the user may not respond directly, may answer incompletely, may respond with information that is off topic, may request to change subjects, or may be unresponsive. The user may also respond to questions with other questions, such as requests for background information or requests to clarify a previous question. Topic manager 104 may therefore generate other types of requests to AI system 105 in these different scenarios; for example, it may ask the AI system to determine whether the user has directly answered the question or has gone off-topic. It may also ask the AI system to answer a question posed by the user. Any types of requests may be transmitted to the AI system to continue the dialog between the system and the user based on the user's responses and requests. The specific requests to the AI system may change based on the type of response a user provides.

Figure 2:
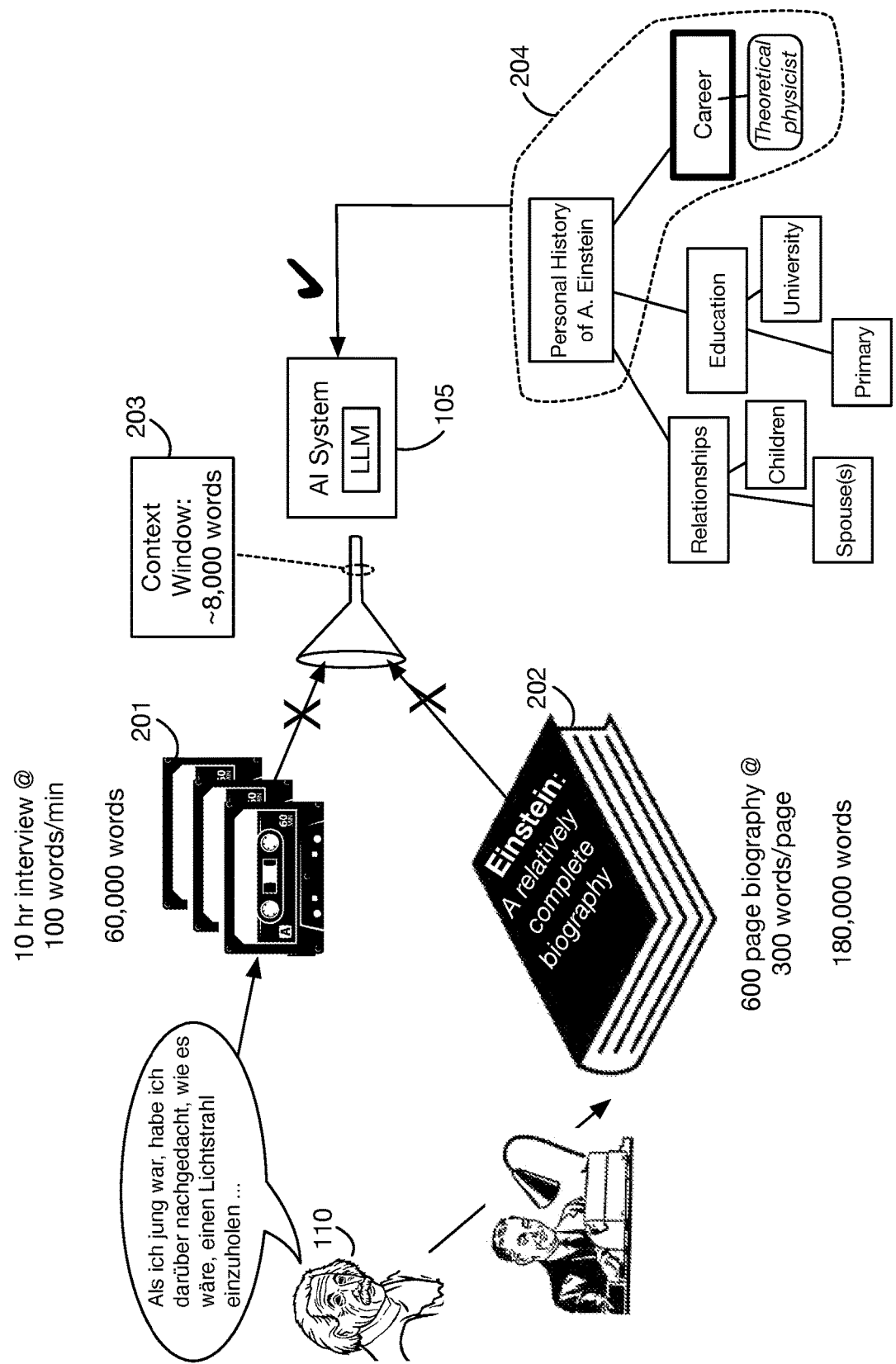
FIG. 2 illustrates one of the benefits of the invention: by structuring information hierarchically, a topic manager can transmit a relevant subset of information to an AI system that fits within the AI system's context window, whereas a complete archive of information is too large for the AI system to process.

FIG. 2 illustrates one of the potential benefits of organizing topics into a tree of topic nodes and using a summary of a current node to generate a question request: this tree organization may be used to provide concise relevant context for requests to the AI system 106 that fit within the AI system's context window size limitation. To illustrate the issue, a typical LLM has a context window 203 of approximately 8000 words; this represents the maximum information that can be transmitted to the LLM for analysis for the LLM to respond (for example with a question for the user). This relatively small context window 203 makes it impossible for the AI system to ingest complete records of a user's biography, for example, or records of any relatively large and complex topic. For example, a 600-page biographical book 202 of a person may contain approximately 180,000 words, which is far too large to fit into context window 203. Similarly, 10 hours of interview transcripts 201 with a user may contain approximately 60,000 words, which again is far too large for context window 203. It therefore becomes necessary to select a relevant subset of information in an archive like book 202 or interview 201 and to use this subset in requests to AI system 105. A topic tree provides a natural and effective mechanism for selecting a relevant subset. Data 204, which may include for example the current topic node and its summary, and the tree path to the current node, can be used to generate AI requests, and this data can fit within the context window 203.

Reducing the amount of context that needs to be transmitted to the AI system may have other benefits as well, such as reducing latency and cost. The AI system takes time to ingest, parse, and process the context for each interaction, so reducing the context makes the AI system more responsive. Organizing context data into a topic tree also improves the AI system's ability to understand each request and to generate questions (or other information) that are relevant to the current topic, without duplication.

Figure 3:
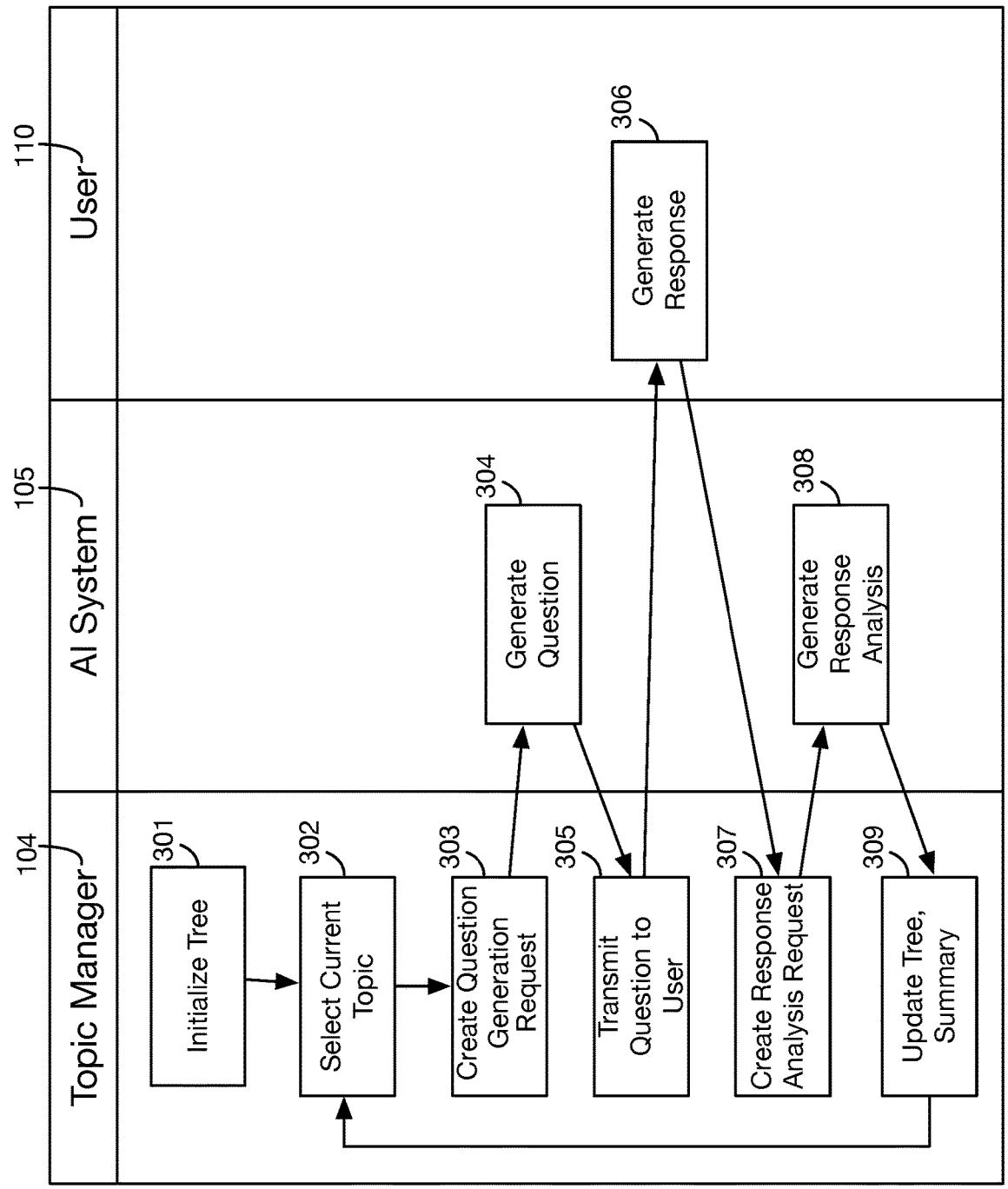
FIG. 3 shows an activity diagram for illustrative steps in a dialog between the system and a user.
Figure 8:
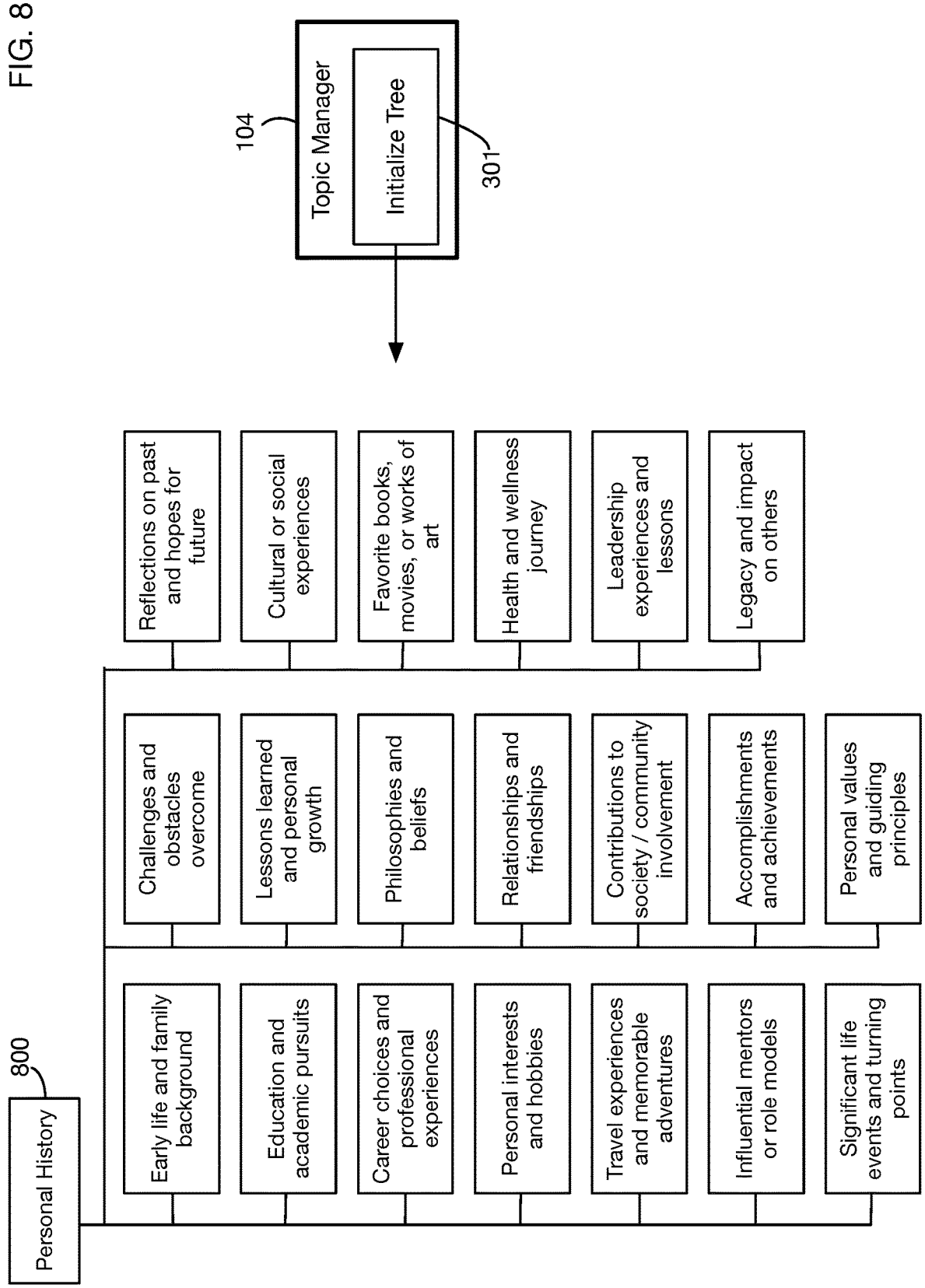
FIG. 8 shows illustrative topic nodes that may be used to initialize a tree of topics for a dialog with a user to collect the user's personal history.

FIG. 3 shows an activity diagram for illustrative steps in managing and conducting the dialog between the system and the user. In one or more embodiments the system may perform additional steps or a subset of these steps and may perform steps in a different order. This diagram shows a simple scenario where the system generates a question and the user responds to the question; variations on these steps may be applied to other scenarios, for example when the user strays off topic or asks the system for information. To begin the process, topic manager 104 performs step 301 to initialize the topic tree. This may for example include creating the root node and seeding the tree with a set of topics that may be relevant. (The discussion below with respect to FIG. 8 shows an illustrative initial tree for a personal history.) Steps 302 through 309 are then performed repeatedly, until either the system or the user determines that enough information has been collected. In step 302, the topic manager selects the current topic node for a subsequent question; this selection may be based on input from the AI system or based on algorithms executed by the topic manager to ensure coverage of all topics in the tree. In step 303, the topic manager creates a question generation request and transmits this request to the AI system 105. Each request may include one or more prompts or function calls (or both) to the AI system. AI system 105 then performs step 304 to generate a question, and topic manager performs step 305 to transmit this question to the user. The user then performs step 306 to generate a response, which is transmitted back to topic manager 104. The topic manager then performs step 307 to create a response analysis request, using the response as input to the request. The response analysis request is transmitted to the AI system 105, which performs step 308 to generate a response analysis. Topic manager 104 then performs step 309 to update the topic tree and the summary of the current topic node, and it then repeats the cycle by selecting the next current topic in step 302.

In one or more embodiments, steps 304 and 308 may be combined in some cases, so that AI system 105 simultaneously generates a response analysis of the user's last response and generates a subsequent question for the user. Combining these steps may be done for example when the current topic does not change, or when the AI system suggests a specific next topic. Combining these steps may for example reduce the overhead and expense of making separate calls to the AI system's LLM, which may be a paid service in some situations.

Figure 4:
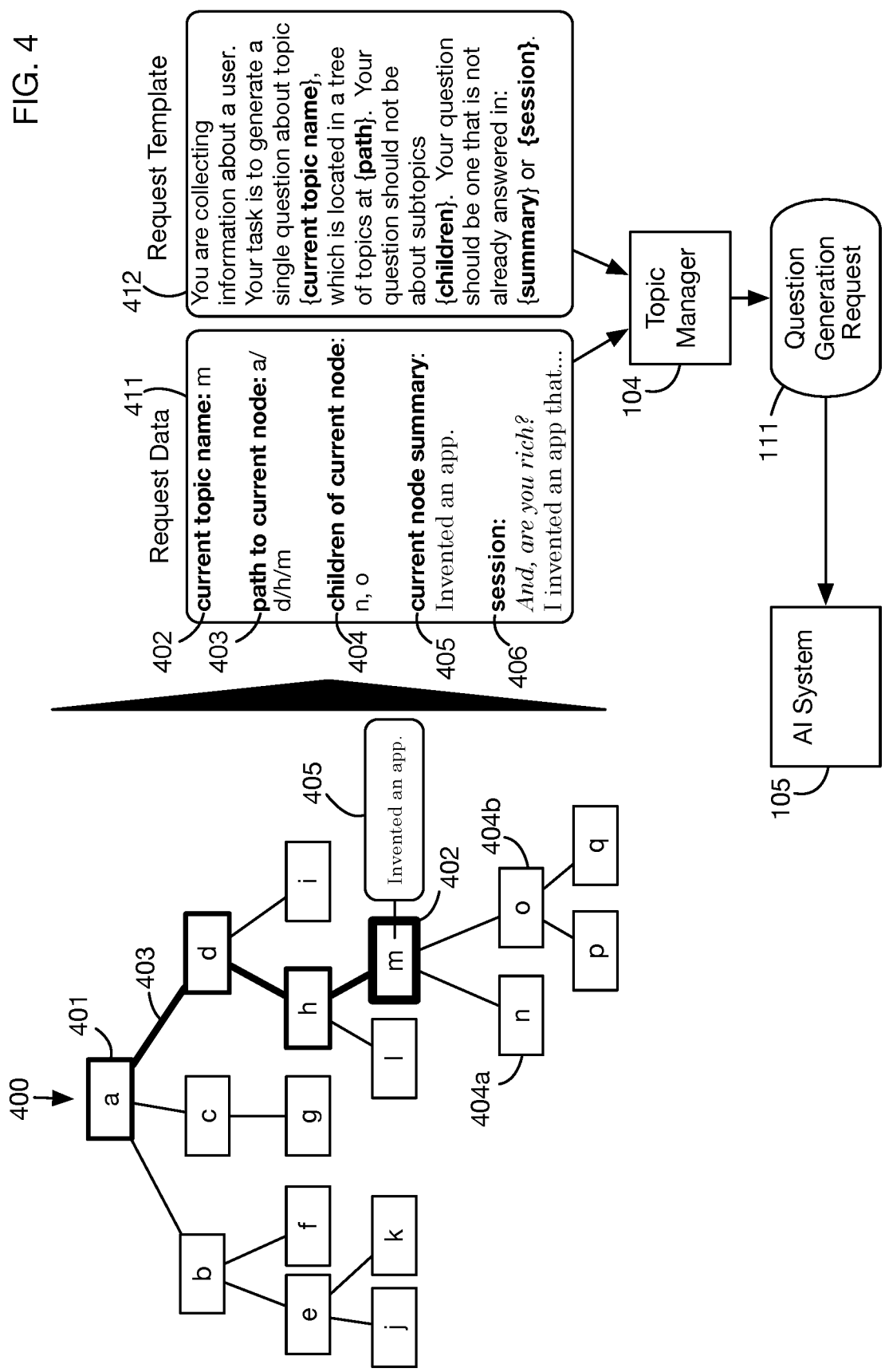
FIG. 4 illustrates creation of a question generation request that is sent to the AI system to request the system to generate a question for the user.

FIG. 4 shows an illustrative example of topic manager 104 creating a question generation request 111. Topic tree 400 (shown with symbolic topic names for ease of exposition) has root node 401, and node 402 is the current topic node. Current node 402 has a summary 405, which summarizes a conversation session 406 between the system and the user on the current topic. Node 402 has direct child nodes 404a and 404b for subtopics placed under node 402. This tree information is summarized in request data 411, which includes the name 402 of the current topic, the path 403 from root node 400 to the current node 402, the children 404 of the current node, the summary 405 of the current node, and the conversation session 406 associated with the current node. This request data is inserted into request template 412 (with the fields to be inserted indicated in bold and in braces) by topic manager 104, to create the question generation request 111 that is transmitted to AI system 105. In this example, template 412 instructs the AI system to generate a single question for the user; in one or more embodiments the template may instruct the AI system to generate multiple questions related to the topic, which may then be asked sequentially for example, or one or more of the generated questions may be selected randomly.

Figure 5:
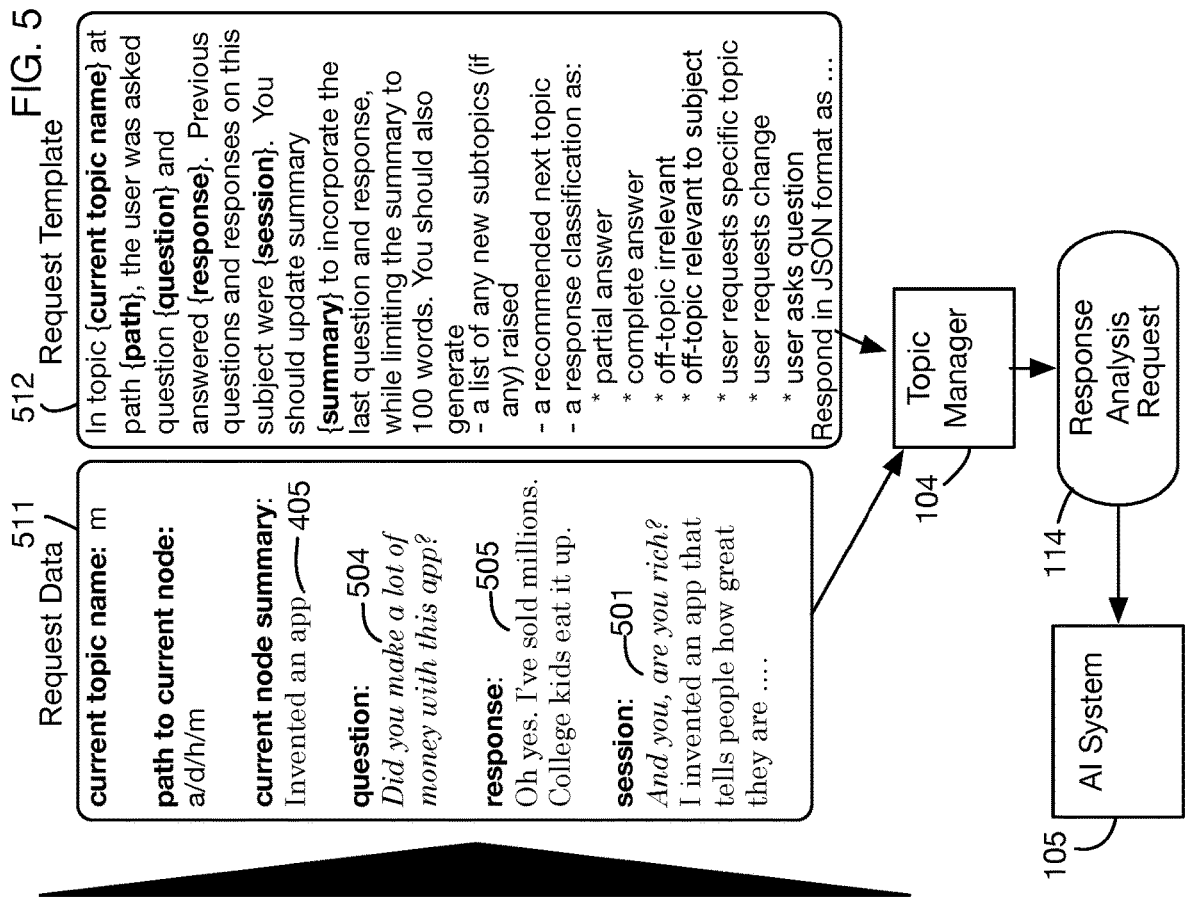
FIG. 5 illustrates creation of a response analysis request that is sent to the AI system to request the system to analyze a user's response to a question.

FIG. 5 continues the example of FIG. 4 to illustrate creation of response analysis request 114. In addition to data from the topic tree 400, a relevant portion of the dialog 500 between the system and the user may also be included in the response analysis request. Because the entire dialog 500 may be very long, the topic manager and/or the AI system may break the dialog into conversation "sessions," where each session represents the questions and responses that are exchanged between the system and the user to obtain a sufficient answer to an initial question from the system about a specific topic. (A sufficient answer may answer the initial question completely, or the AI system may determine that the answer is sufficient and that it is unlikely to obtain much more information on this topic from the user with additional questions.) In some situations, a session may span multiple question/response cycles, since the user may provide partial responses that require follow-up or may raise other topics before sufficiently answering an initial question. In illustrative dialog 500, the system asks an initial question 502 about a topic, and the user's first response 503 is not a sufficient answer. The system therefore asks a follow-up question 504 to attempt to get a sufficient answer, and the user's response 505 answers the question sufficiently. This session 501 therefore starts with the initial question 502 and ends with the final answer 505.

Request data 511 for the response analysis request 114 includes the most recent response 505 that should be analyzed, along with the question 504 that led to this response, and the conversation session 501 in which the question and response appear. It also includes the current summary 405 of the current topic node, which may be based on the user's previous response 503 in this session. This data is inserted into request template 512 (with the fields to be inserted indicated in bold and in braces); the request template 512 contains instructions to the AI system on what to analyze and what types of output to generate in the response analysis. Illustrative template 512 instructs the AI system to generate multiple types of output in the response analysis, including an updated summary, a list of new topics raised by the user (if any) in the latest response, a recommended next topic for discussion, and a classification of the user's response (which may indicate for example the relevance of the response to the current topic). This output is illustrative; one or more embodiments may instruct the AI system to generate any type of data in its analysis of the user's response. Response classification may use any set of response types; illustrative types include for example: "partial answer" to indicate that the user addressed the question but without completely answering, "complete answer" to indicate that the initial question in the session has been sufficiently answered, "off topic irrelevant" to indicate that the user spoke about some unrelated subject (and may need to be reminded to get back to the main subject of the dialog), "off topic relevant" to indicate that the user spoke about a subject that is not related to the current topic but is relevant to the overall subject of the dialog, "user requests specific topic" to indicate that the user asked to change the subject to a specific different topic, and "user requests change" to indicate that the user asked to change the subject but did not indicate a specific next topic for discussion. Other response classification systems may be used in one or more embodiments of the invention.

Request template 512 also instructs the AI system to respond in JSON (JavaScript Object Notation) format. The template may include a specific format with tags for individual fields in the response analysis. The use of JSON format is illustrative; one or more embodiments may use any type of format including for example, without limitation, freeform text, JSON, XML, CSV, SQL, Markup, or any other type of structure.

Figure 6:
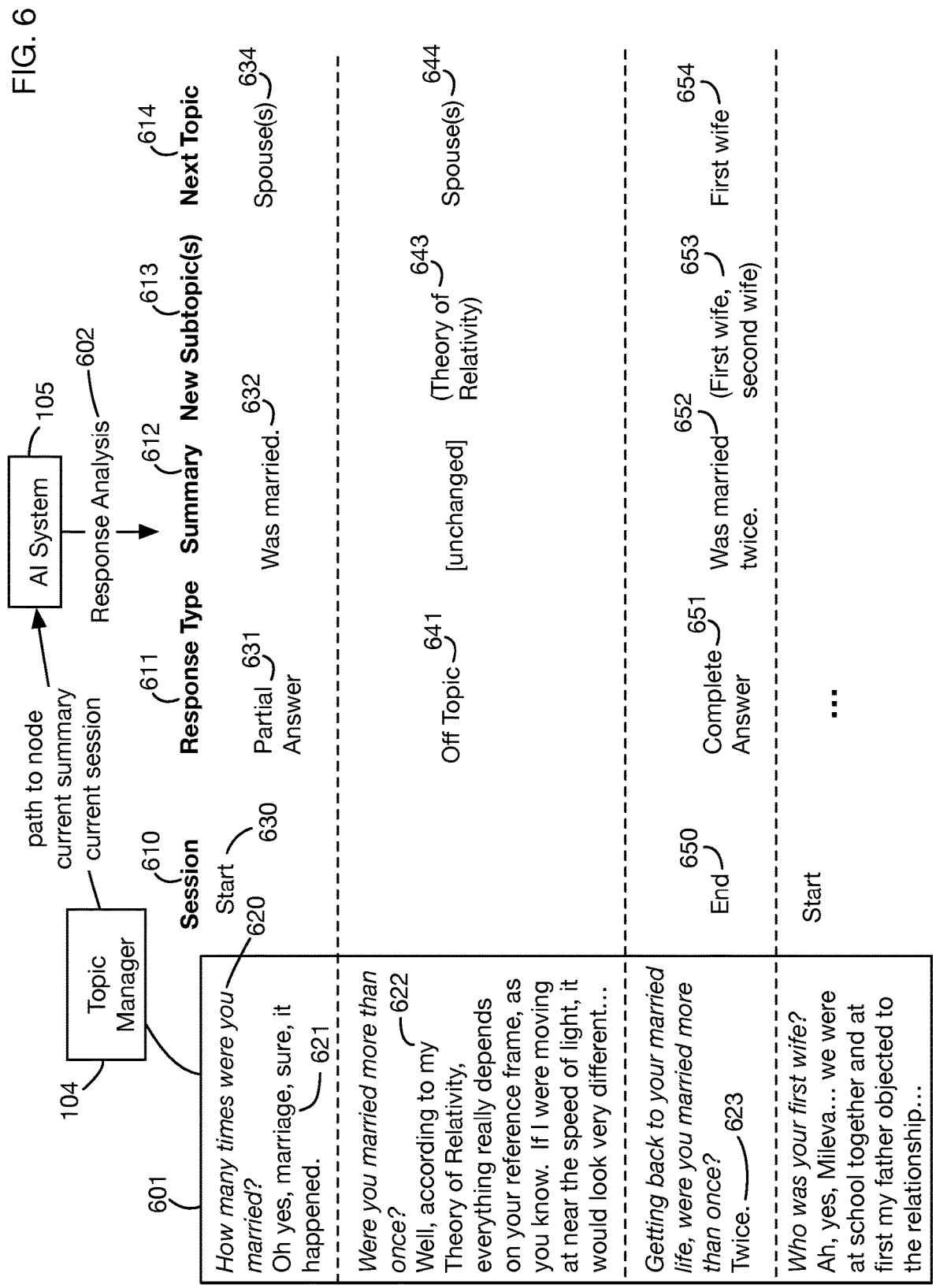
FIG. 6 shows an illustrative conversation session between the system and the user, and elements of the response analysis generated for each of the user's responses.

FIG. 6 shows an illustrative portion 601 of a dialog with user 110 from the example of FIG. 1, with response analyses 602 for each of the user's responses 621, 622, and 623. This illustrative response analysis data includes session boundaries 610, a response type 611, an updated summary 612 for the current topic, any new subtopic(s) raised 613, and a recommended next topic 614. The start 630 of a session begins when an initial question 620 is asked about a specific topic (Spouse(s)). The user's first response 621 is classified as a Partial Answer 631, and summary 632 is generated based on the response. The system recommends that the next topic 634 remain the same (Spouse(s)) since the user has not completely answered the question. The response 622 to the next question is classified as Off Topic 641, since the user wandered into a different area in his response. Summary 612 is therefore unchanged. Although the user did not answer the question, he did raise a new subtopic 643, which will be added to the topic tree since it is not related to the current topic; this new topic may be explored later. The next topic 644 remains the same (although in some situations the system might select for example the newly raised subtopic 643 for the next topic). The user's next response 623 does fully answer the initial question 620, so the session is marked as completed with boundary 650, and the response type 651 is Complete Answer. Summary 652 is updated based on response 623. Two new subtopics 653 are identified (and added to the topic tree), and one of these subtopics 654 is selected as the next topic. The next question on this new subtopic begins a new session.

In some situations, a conversation on a specific topic may become so long or complex that it may be necessary or beneficial to branch (split) the conversation into multiple sessions. For example, if the session conversation exceeds the AI system's context window size, then it may not be possible to send the entire conversation in a prompt or other request to the AI system. The system may then trigger a session boundary when the conversation exceeds a certain length, and either split the topic node into subtopics or generate a summary of the conversation to replace the entire session conversation. The system may also split a current topic node into two or more new topic nodes if one or more size metrics exceed associated thresholds. Size metrics that may trigger a topic node split may include for example, without limitation, the length of the summary, the number of questions asked, the amount of metadata associated with the node, or the complexity of the information collected about the topic. Branching to create subtopics may also occur for example when the user mentions a topic that is worth discussing in its own subtopic; this determination may be made by either the topic manager or the AI system. When the system splits a topic node into new topic nodes, it may generate a summary for each of the new topic nodes, based for example on the summary or conversation associated with the of the topic node before it was split. The determination of whether to split a topic node into two (or more) sub-nodes may be made by the topic manager, or the AI system may indicate in its response analysis that a node should be split.

Figure 7A:
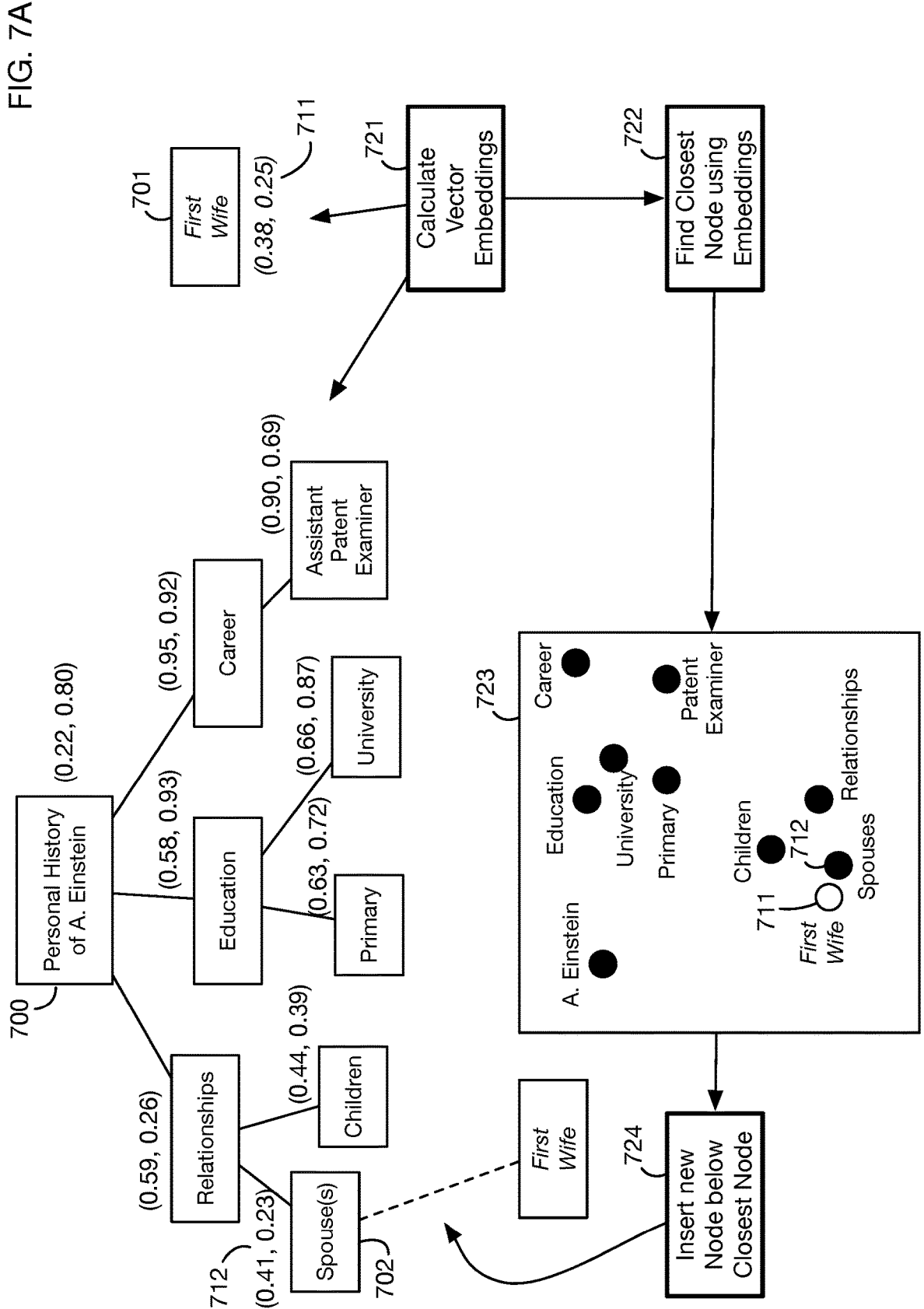
FIG. 7A illustrates a method that may be used in one or more embodiments to determine where in a tree of topics to insert a new topic node; this method calculates vector embeddings and inserts a new node below the node with the closest embedding.

When new topics are identified in the dialog with the user, such as topics 643 and 653, these topics may be added to the topic tree as child nodes of the most closely related topic node. FIG. 7A shows one illustrative method that may be used in one or more embodiments by the topic manager to determine where in the topic tree to add a new topic node. This method is illustrated with the topic tree 700 from FIG. 1, with a new node 701 to be added to the tree. The first step 721 is to calculate a vector embedding for each node in the tree 700 and for the new node 701 to be added. For ease of illustration, FIG. 7A shows vector embeddings calculated for the topic name of each topic node; vector embeddings may be calculated on any data associated with a topic node, such as the topic summary, topic guidance, metadata, or even the complete question and response history. Vector embeddings typically calculate a dense real vector that represents a word or a list of words. The dimension of the calculated vector may be for example in the hundreds. In this example we use two-dimensional embedding vectors for ease of illustration; applications will typically use much higher dimensional vectors. Embodiments may use any of the existing vector embedding techniques, such as for example Word2Vec, GloVe, or embeddings provided by LLMs such as GPT. The new topic 701 has a calculated vector embedding 711 in this simplified example.

Step 722 then finds the topic node in tree 700 that has the closest vector embedding to the vector 711 calculated for new node 701. Graph 723 shows illustrative vectors for the topic names of each of the tree nodes in tree 700, and the vector 711 for the topic name of the new node 701. The closest vector 712 (measured for example by Euclidean distance) is associated with tree node 702. Step 724 therefore inserts the new node 701 as a child node of this node 702. The system may generate a summary for the new node 701 based on any responses previously received from the user that are relevant to the new node. Vector embeddings for existing nodes may be calculated and cached for each node and may be updated when the associated node information changes.

Figure 7B:
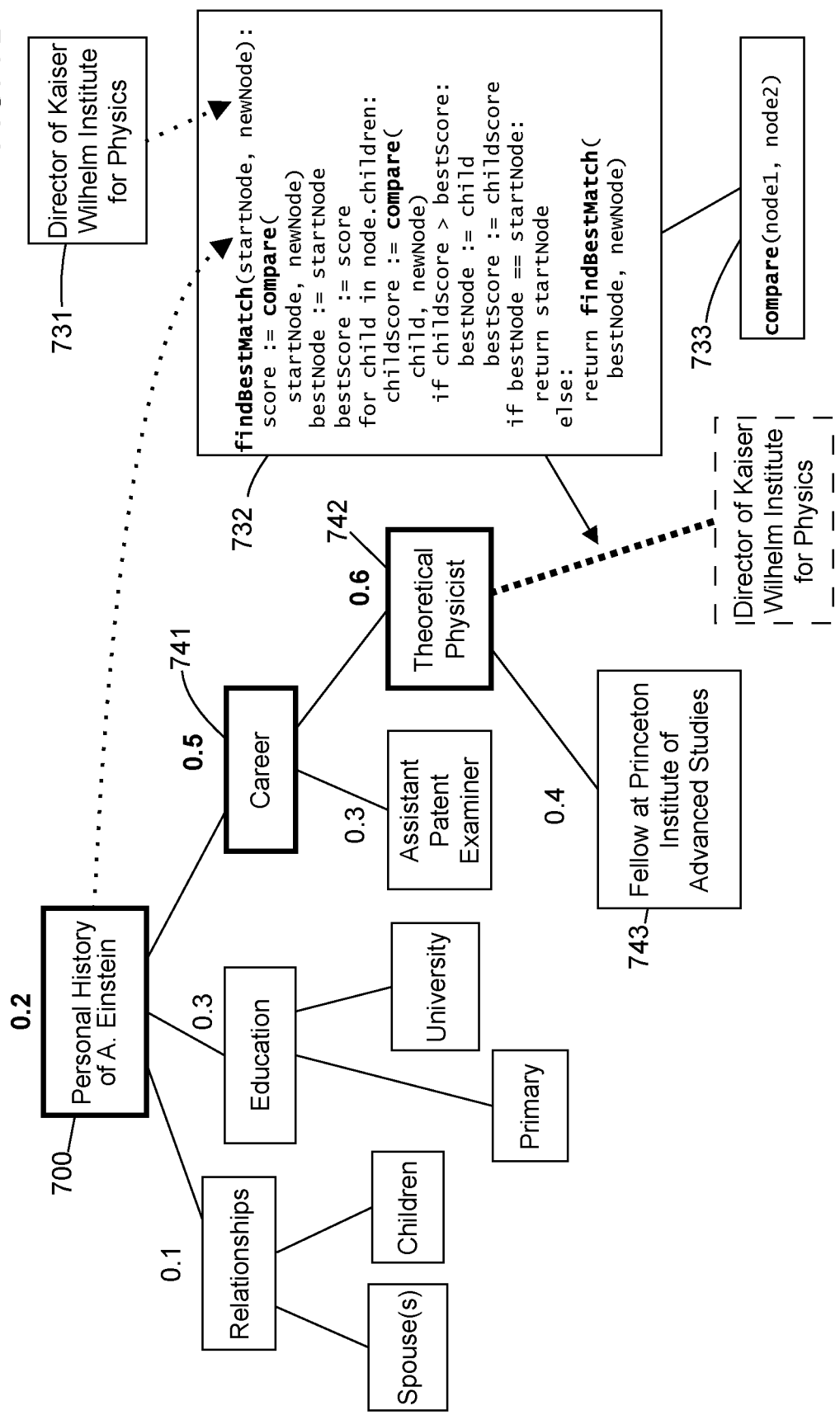
FIG. 7B illustrates another method that may be used in one or more embodiments to determine where in a tree of topics to insert a new topic node; this method walks recursively down the tree, starting at the root, until it finds a node that matches the new node more closely than any of its children.

FIG. 7B illustrates a different method that may be used in one or more embodiments to determine where in the topic tree to add a new topic node. In this method, a comparison function 733 is used to calculate a proximity score between two nodes. This comparison function may for example use embeddings as illustrated in FIG. 7A, or it may use any other comparison technique such as a BM25-like algorithm that uses token and n-gram overlaps. Any type of comparison function may be used in one or more embodiments of the invention. Comparison may be based on any of the node information, including its topic name, summary, metadata, or raw dialog history.

A recursive search function 732 may walk the topic tree, starting at the top, to find a topic node in the tree that has a high proximity score relative to the new node 731 to be added. In this illustrative embodiment, function 732 goes down the tree from the root and at each level it finds the child node with the highest proximity score. If the currently selected node has a higher proximity score than any of its children, then that node is returned and the new node 731 is added below that node; otherwise, the search continues down the tree. The search may also stop when it reaches a leaf node, or if none of the currently selected node's children have a score that exceeds a pre-defined threshold; in these cases, the new node is also added as a child below the currently selected node. In the example shown, the proximity scores for each tree node visited are shown in bold above the node. The search starts at root 700, continues to node 741, and then to node 742 where the search terminates since the child node 743 of node 742 has a lower proximity score than the score of node 742; the new node is therefore added below node 742. The specific algorithm 732 is illustrative; any method of walking the tree to find a good match to the new node is in keeping with the spirit of the invention.

FIG. 8 illustrates step 301 to initialize a topic tree. In this example, the system dialog is focused on a user's personal history, so the root node 800 has topic name "Personal History". Topic manager 104 may also add children or deeper descendant nodes under root node 800 to help structure the conversation with the user. Illustrative child topic nodes for a personal history dialog are shown in FIG. 8. One or more embodiments may use any subset or superset of these illustrative topic nodes. Subjects other than personal histories may have other types of topic nodes below a root node; for example, a dialog focused on obtaining an expert's knowledge about a specific field of study might have initial subtopics such as "History of the field", "Major branches of knowledge", "Applications", "Recent advancements", and "Unsolved problems". In one or more embodiments of the invention, background information about a topic may be loaded into the AI system prior to conducting a dialog with the user, and the system may discover an initial set of topics for the topic tree based on this background information.

Figure 9:
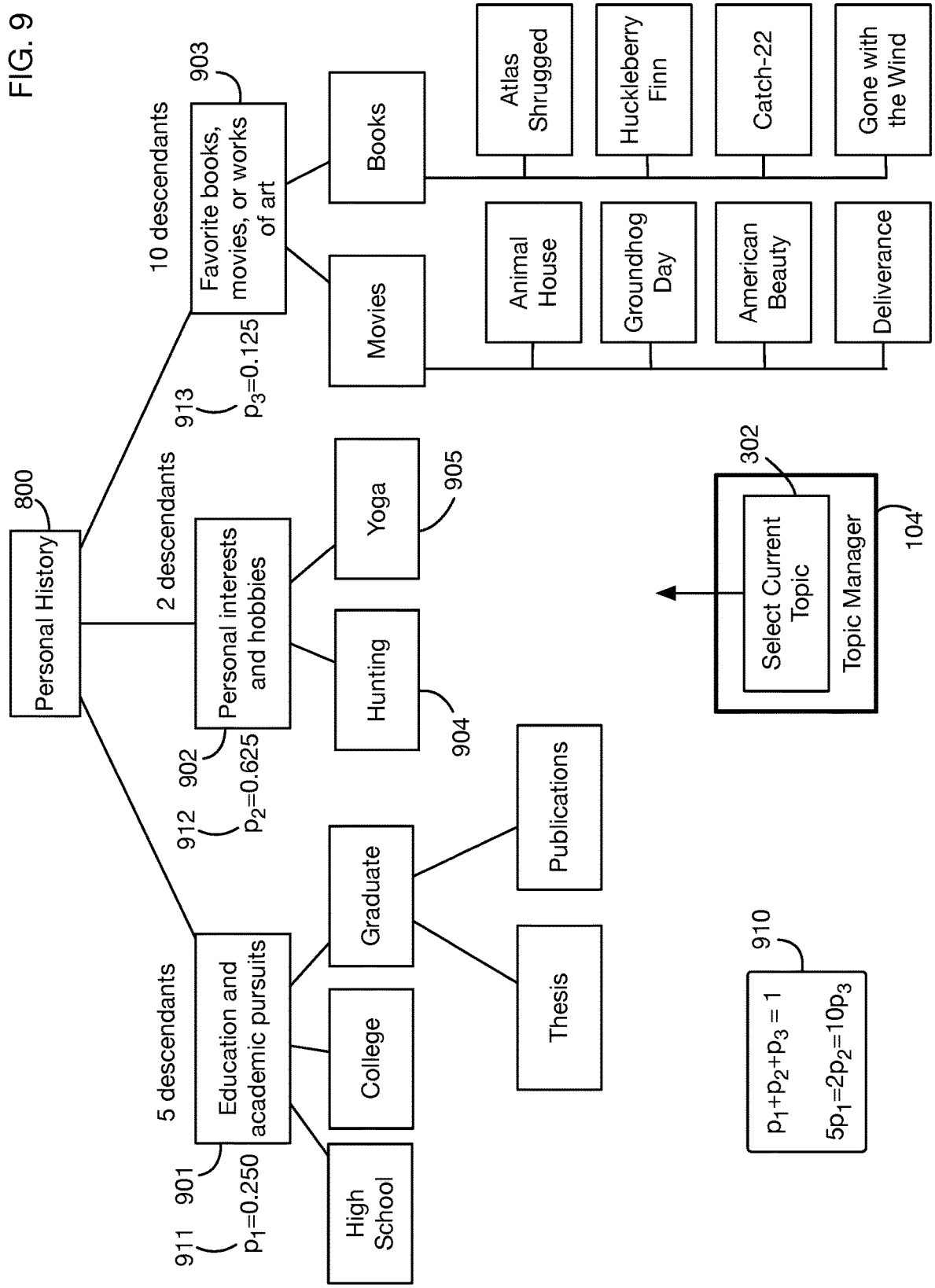
FIG. 9 shows an illustrative method that may be used in one or more embodiments to select a node from the topic tree for subsequent questions; this method assigns higher selection probabilities to nodes that have been less explored.

As illustrated for example in FIG. 6, in some situations the response analysis generated by the AI system may include a recommended next topic 614 for a subsequent question (which may be the same as the topic of the previous question, a new topic identified in the discussion with the user, or a different topic the user has specifically asked to discuss). However, in other situations the next topic for a subsequent question may not be identified in the response analysis, and the topic manager 104 itself may need to determine the next topic. This situation may occur for example when the user asks to change the subject but without specifying a new subject, or when a session completes without an obvious next topic. It may also occur when beginning a dialog for the first time or resuming a dialog after a break. FIG. 9 shows an illustrative technique that may be used in one or more embodiments to select a next topic 302 for discussion when the next topic is unspecified or not obvious. The topic manager 104 may use any desired strategy to select a next topic, including walking through the topic tree in any order or selecting topic nodes at random. FIG. 9 illustrates a strategy that selects a next topic randomly, but with a bias towards filling out areas of the topic tree that have been less explored in the dialog to date with the user. This example uses a variation of the topic tree from FIG. 8, with root node 800 and three direct children 901, 902, and 903. The topic manager performs a biased walk through the topic tree, where the probability of selecting each node at a current level is inversely related to the extent to which that node has already been explored in previous dialog, compared to the extent of exploration for that node's siblings. Different measures of the degree of exploration of a node may be used, including for example the number of questions asked previously for the node's topic, the size of the node's summary, a measure of the engagement of the user with previous questions on the topic (such as the average length of each user's response for that topic, or how much the user stayed on-topic in the responses), or the recency of questioning related to the node's topic. The method shown in FIG. 9 uses a simple measure of the extent of exploration of a node, which is the number of descendant nodes currently in the tree below each node. For example, node 901 has 5 descendants, node 902 has 2 descendants, and node 903 has 10 descendants; this suggests that node 903 is the most explored and node 902 is the least explored. Calculation 910 may be used for example to determine the selection probabilities 911, 912, and 913 for each node 901, 902, and 903, respectively, so that the probability of selection is inversely proportional to the number of descendants of each node. Once a node is selected, this process may continue to select among the node's children nodes, again using selection probabilities that are inversely related to each child node's degree of exploration; this biased walk may continue down the tree until a stopping criterion is satisfied, which may be random or may be a function of the information associated with the node. This method ensures that all parts of the tree can be explored, and that underpopulated parts of the tree will be explored more frequently.

Once a topic node is selected at a specified level in the tree, a question may be generated for that topic, or the biased walk may continue with the child nodes of the selected node. For example, if the topic manager selects node 902, a question could be asked on that topic (such as "Do you have other hobbies besides hunting and yoga?"), or a further probabilistic selection could be made among the child nodes 904 and 905. In this scenario the selection probability of each of the child nodes 904 and 905 would be 0.5 since neither has any descendants.

In one or more embodiments of the invention, the system may use other measures of how well-explored each node is when selecting a new node. For example, a measure of the degree to which a node has been explored may be the length of the summary associated with the node, or the number of questions previously asked that are related to that node. A biased probability selection may be made with these or any other measures using for example the method illustrated in FIG. 9.

In some scenarios, the dialog between the system and the user may include questions asked by the user. These situations may occur for example when the user needs some background information to fully answer one of the questions from the system. The user may also ask questions of the system to be reminded of his previous responses or of any other data that the system has collected during the dialog. FIG. 10 shows an illustrative situation with a portion of a dialog 1001 between the user 110 and the artificial intelligence system 105 (which is mediated through the topic manager). The system 105 asks a question 1002 of user 110. The user's answer is incomplete, and the user asks a question 1003 to obtain background information in order to complete his response. The AI system generates a response 1004 with the requested information, and then asks a follow-up question 1005. The background information is sufficient for the user to provide a complete response 1006 to the original question 1002. In general, exchanges between the user and the system may include questions from either the system or the user, and responses from either the user or the system. As with user response 1003, a response may contain a combination of information (in this case a partial response) and a clarifying question that requests more information from the system. Similarly, the system response 1004 may contain a combination of information 1004 and a follow-up question 1006. Requests for response analysis to AI system 105 may indicate that the AI system should both answer any questions posed by the user and generate additional questions for the user.

While the invention herein disclosed has been described by means of specific embodiments and applications thereof, numerous modifications and variations could be made thereto by those skilled in the art without departing from the scope of the invention set forth in the claims.

What is claimed is:

1. A hierarchically structured topic manager that organizes dialogs with an artificial intelligence system, comprising:

a processor coupled to a memory and to a user interface used by a user;

a hierarchical topic database stored in said memory comprising a tree of topic nodes, wherein each topic node of said topic nodes comprises a topic name; and
one or both of
   one or more questions related to said topic name and responses from said user to said one or more questions; and,
   a summary that summarizes all or a portion of said responses from said user to said one or more questions related to said topic name;
an artificial intelligence system configured to execute on said processor, wherein said artificial intelligence system comprises a large language model;
a topic manager configured to execute on said processor and coupled to said hierarchical topic database and to said artificial intelligence system, wherein said topic manager is configured to repeatedly
   track a current topic node in said tree of topic nodes;
   create a question generation request based on said hierarchical topic database and on said current topic node;
   transmit said question generation request to said artificial intelligence system and receive a question from said artificial intelligence system that is related to said current topic node and that has not been answered in said responses from said user to said one or more questions or in said summary;
   transmit said question to said user via said user interface;
   receive a response from said user via said user interface;
   create a response analysis request based on said response from said user;
   transmit said response analysis request to said artificial intelligence system and receive a response analysis from said artificial intelligence system;
   update said hierarchical topic database and said current topic node based on said response analysis; and,
   when said response analysis comprises an indication that another unspecified topic should be selected:
      randomly select a node in said tree using selection probabilities that are higher for nodes in said tree that have been less explored in discussions with said user; and
      set said current topic node to said node in said tree.

2. The hierarchically structured topic manager that organizes dialogs with an artificial intelligence system of claim 1, wherein a root topic node of said tree comprises a personal biography of said user.

3. The hierarchically structured topic manager that organizes dialogs with an artificial intelligence system of claim 2, wherein child nodes of said root topic node comprise one or more of early life and family background;
education and academic pursuits;
career choices and professional experiences;
personal interests and hobbies;
travel experiences and memorable adventures;
influential mentors or role models;
significant life events and turning points;
challenges and obstacles overcome;
lessons learned and personal growth;
philosophies and beliefs;
relationships and friendships;
contributions to society or community involvement;
accomplishments and achievements;
personal values and guiding principles;
reflections on past and hopes for future;
cultural or social experiences;
favorite books, movies, or works of art;
health and wellness journey;
leadership experiences and lessons;
legacy and impact on others.

4. The hierarchically structured topic manager that organizes dialogs with an artificial intelligence system of claim 1, wherein each topic node of said topic nodes further comprises metadata comprising one or more of
one or more names;
one or more locations;
one or more dates; and,
one or more named entities.

5. The hierarchically structured topic manager that organizes dialogs with an artificial intelligence system of claim 1, wherein said question generation request and said response analysis request are combined into a single request.

6. The hierarchically structured topic manager that organizes dialogs with an artificial intelligence system of claim 1, wherein one or both of said question generation request and said response analysis request comprise a plurality of prompts or function calls transmitted to said artificial intelligence system.

7. The hierarchically structured topic manager that organizes dialogs with an artificial intelligence system of claim 1, wherein said question generation request comprises
information associated with said current topic node;
a path from a root of said tree to said current topic node;
topic names of child nodes of said current topic node; and,
an instruction to said artificial intelligence system to generate one or more questions about said topic name of said current topic node that are not answered in said summary and are not related to said child nodes.

8. The hierarchically structured topic manager that organizes dialogs with an artificial intelligence system of claim 7, wherein said information associated with said current topic node comprises one or more of
said topic name of said current topic node;
said one or more questions related to said topic name and said responses from said user to said one or more questions; and,
said summary that summarizes said responses from said user to said one or more questions related to said topic name.

9. The hierarchically structured topic manager that organizes dialogs with an artificial intelligence system of claim 1, wherein said response analysis request comprises information associated with said current topic node;
said question;
said response from said user; and,
an instruction to said artificial intelligence system to
   update said summary based on said response from said user; and
   identify one or more of
      relevance of said response to said topic name;
      additional topics identified in said response; and
      a recommended next topic.

10. The hierarchically structured topic manager that organizes dialogs with an artificial intelligence system of claim 9, wherein
said response from said user comprises a request from said user to change to a new topic; and,
said recommended next topic generated by said artificial intelligence system comprises said new topic.

11. The hierarchically structured topic manager that organizes dialogs with an artificial intelligence system of claim 1, wherein one or both of said topic manager and said artificial intelligence system are further configured to
  split said current topic node into two or more new topic nodes; and,
  generate summaries associated with each of said two or more new topic nodes.

12. The hierarchically structured topic manager that organizes dialogs with an artificial intelligence system of claim 11, wherein one or both of said topic manager and said artificial intelligence system are further configured to split said current topic node when
  one or more size metrics associated with said current topic node exceed a threshold; or,
  said response from said user raises a topic that said topic manager or said artificial intelligence system determines should be in a new topic node.

13. The hierarchically structured topic manager that organizes dialogs with an artificial intelligence system of claim 1, wherein said topic manager is further configured to
  track a conversation session comprising
    a starting point when said artificial intelligence system generates an initial question about said topic name of said current topic node;
    an ending point when said response analysis comprises a determination that said initial question has been sufficiently answered; and
    questions generated by said artificial intelligence system and responses provided by said user between said starting point and said ending point; and,
  include said conversation session in said response analysis request.

14. The hierarchically structured topic manager that organizes dialogs with an artificial intelligence system of claim 1, wherein said response analysis comprises one or more additional topics raised in said response from said user.

15. The hierarchically structured topic manager that organizes dialogs with an artificial intelligence system of claim 14, wherein said topic manager is further configured to
  for each additional topic of said one or more additional topics
    identify a related topic node in said tree that is most closely related to said each additional topic;
    insert a new node as a child of said related topic node and assign a topic name of said new node as said each additional topic; and,
    generate a summary of said new node based on responses from said user related to said topic name of said new node.

16. The hierarchically structured topic manager that organizes dialogs with an artificial intelligence system of claim 1, wherein
  said response analysis comprises a next topic for discussion; and,
  said topic manager is further configured to
    select a node in said tree corresponding to said next topic for discussion; and
    set said current topic node to said node in said tree.

17. The hierarchically structured topic manager that organizes dialogs with an artificial intelligence system of claim 1, wherein a selection probability of a node is inversely related to one or more of
  a number of descendants in said tree of said node;
  a measure of engagement by the user with questions previously asked associated with said node;
  a recency of questioning related to said node;
  a length of a summary associated with said node; and,
  a number of questions previously asked associated with said node.

18. The hierarchically structured topic manager that organizes dialogs with an artificial intelligence system of claim 17, wherein the measure of engagement by the user with questions previously asked associated with said node comprises one or more of:
  an average length of responses from the user to said questions previously asked associated with said node; and,
  how much the user stayed on-topic in said responses from the user.

19. The hierarchically structured topic manager that organizes dialogs with an artificial intelligence system of claim 17, wherein the measure of engagement by the user with questions previously asked associated with said node comprises:
  whether the user asked to change a subject in responses from the user to said questions previously asked associated with said node.

20. The hierarchically structured topic manager that organizes dialogs with an artificial intelligence system of claim 1, wherein
  said response from said user comprises a request from said user for information;
  said response analysis request to said artificial intelligence system comprises instructions for said artificial intelligence system to generate an answer to said request from said user for information; and,
  said topic manager is further configured to transmit said answer to said user via said user interface.

* * * * *